US007676765B2

(12) United States Patent
Golibrodski et al.

(10) Patent No.: US 7,676,765 B2
(45) Date of Patent: Mar. 9, 2010

(54) THREE DIMENSIONAL GRAPHICAL MANIPULATOR

(75) Inventors: Olivier Golibrodski, Paris (FR); Pascal Pradeau, Suresnes (FR)

(73) Assignee: Dassault Systems, Cedex (FR)

( * ) Notice: Subject to any disclaimer, the term of this patent is extended or adjusted under 35 U.S.C. 154(b) by 427 days.

(21) Appl. No.: 10/823,075

(22) Filed: Apr. 12, 2004

(65) Prior Publication Data

US 2004/0189724 A1 Sep. 30, 2004

Related U.S. Application Data

(63) Continuation of application No. 09/329,730, filed on Jun. 10, 1999, now Pat. No. 6,762,778.

(51) Int. Cl.
*G06K 15/00* (2006.01)

(52) U.S. Cl. ....................................... 715/851; 715/964

(58) Field of Classification Search ................. 715/836, 715/757, 848–852, 771–773, 964, 967; 345/419, 345/644, 629, 649–659

See application file for complete search history.

(56) References Cited

U.S. PATENT DOCUMENTS 5,375,156 A * 12/1994 Kuo-Petravic et al. ......... 378/9

(Continued)

FOREIGN PATENT DOCUMENTS

GB 2 316 591 1/1998

(Continued)

OTHER PUBLICATIONS

Fast 3D Model Drawing Method for 3D-CAD in Rotation/Moving, Disclosed by International Business Machines Corporation, Research Disclosure, Mar. 1999, pp. 422-424.

(Continued)

*Primary Examiner*—Steven P Sax
(74) *Attorney, Agent, or Firm*—Baker & Hostetler LLP

(57) ABSTRACT

A method and apparatus for manipulating a computer generated model and visualizing a change in projection plane before entering a projection creation command. After selection of a projection plane on the 3-D model, a generative drafting document can be created wherein the projection plane becomes the plane of the screen. The system can display a visualization of the projection of the model in plane with the screen, without generating a fully computed projection. Display of the visualization can provide increased efficiency in processing time as compared to a fully computed projection. The system can also display a graphical manipulator including a circular central region with a button in the middle, wherein clicking on the button can be used as a command to the system requesting creation of the projection. The graphical manipulator software tool can also include quadrants, wherein each quadrant is associated with a direction in relation to an orthogonal axis. The four quadrants can be defined as left, right, up and down: Clicking on a quadrant can cause the projection plane to rotate by 90 degrees, or other predetermined amount, around two orthogonal axes of the model in the projection plane. The direction of rotation will correlate with the quadrant selected. In addition, the manipulator tool can include a pin tracking the circumference of a circle displayed on a computer screen. Selection of the pin and rotation can cause the projection plane of a computer generated model to rotate about an axis which is perpendicular to the projection screen.

10 Claims, 21 Drawing Sheets

U.S. PATENT DOCUMENTS

| | | | | |
|---|---|---|---|---|
| 5,392,388 | A | 2/1995 | Gibson | 345/837 |
| 5,592,195 | A | 1/1997 | Misono et al. | 345/860 |
| 5,701,403 | A | 12/1997 | Watanabe et al. | 345/419 |
| 5,729,673 | A | 3/1998 | Cooper et al. | 345/427 |
| 5,745,666 | A | 4/1998 | Gilley et al. | 345/428 |
| 5,874,956 | A * | 2/1999 | LaHood | 715/854 |
| 5,905,501 | A * | 5/1999 | Kato | 345/420 |
| 5,963,211 | A * | 10/1999 | Oikawa et al. | 345/424 |
| 5,990,897 | A | 11/1999 | Hanratty | 345/420 |
| 5,990,901 | A | 11/1999 | Lawton et al. | 345/581 |
| 6,023,279 | A * | 2/2000 | Sowizral et al. | 345/421 |
| 6,219,444 | B1 | 4/2001 | Shashua et al. | 382/154 |
| 6,226,004 | B1 | 5/2001 | Nishihara | 345/420 |
| 6,229,542 | B1 * | 5/2001 | Miller | 715/782 |
| 6,236,406 | B1 | 5/2001 | Li | 345/591 |
| 6,295,603 | B1 * | 9/2001 | Mischo | 713/2 |
| 6,308,144 | B1 | 10/2001 | Bronfeld et al. | 703/2 |
| 6,434,214 | B1 * | 8/2002 | Kawai et al. | 378/4 |
| 6,466,239 | B2 | 10/2002 | Ishikawa | 345/850 |
| 6,529,206 | B1 * | 3/2003 | Ohki et al. | 345/619 |
| 6,633,291 | B1 * | 10/2003 | Sugitani et al. | 345/427 |

FOREIGN PATENT DOCUMENTS

WO WO 98/53428 11/1998

OTHER PUBLICATIONS xmol-X-Based Molecule Viewer and Format Converter, Research Equipment, Inc. d/b/a Minnesota Supercomputer Center, Inc., 1993, pp. 1-17, Retrieved on Apr. 13, 2005 from http://sun.uni-regensburg.de/xmol-1.3.1/html/xmol.1.html.

MCEN201 Computer Aided Engineering, Instructional Notes for the Use of Autocad LT, Tulane University, Department of Mechanical Engineering, Jan. 17, 1998, Retrieved on Apr. 13, 2005 from http:/www.me.tulane.edu/CourseMaterial/INSTRUCT/ACAD/ACADNOTE.HTM.

* cited by examiner

THREE DIMENSIONAL GRAPHICAL MANIPULATOR

CROSS REFERENCE TO RELATED APPLICATIONS

This application is a continuation of U.S. patent application Ser. No. 09/329,730 filed Jun. 10, 1999 now U.S. Pat. No. 6,762,778.

BACKGROUND

The present invention relates to computer software utility programs, and more specifically to selection of a projection plane in computer aided design and computer aided manufacture (CAD/CAM) software systems.

While using CAD/CAM applications it is often desirable to produce two dimensional (2-D) plans representing different views of a three dimensional (3-D) model. Production of 2-D views from the 3-D model can be referred to as generative drafting. One of the difficulties attaching to the generative drafting process is the choice of the most desirable orientations for the drafting views.

In some currently available systems, the selection of the projection plane can be made only on the 3-D model. If a user wishes to change the projection plane, he must revert back to the 3-D model and the system must recompute the 2-D views. Re-computation can take valuable computing time and lead to a loss of productivity. Other systems have included a specific 3-D viewer containing various manipulation commands to avoid this loss of productivity. However, use of the 3-D viewer can also slow down productivity as the user must call the viewer on the screen each time he wants to manipulate the orientation of a projected view.

Other known systems display, by default in the drawing plane, an isometric view of the 3-D model. A user must then define an orientation by the selection of two planes, or edges, with a name of a view he wants to obtain. When the last selection is made, the projection can be computed by the system. Any change in the parameters selected by the user requires the system to generate another projection computation. Such computations can be processor intensive and time consuming.

There is therefore a need for an easy-to-use manipulator which can allow a user to proceed with desired manipulations while staying in the drawing document and to visualize the results of a change of orientation before entering the projection creation command.

SUMMARY OF THE INVENTION

Accordingly, the present invention provides a method and apparatus for manipulating a computer generated model and visualizing a change in projection plane before entering a projection creation command.

Once a user has selected a projection plane on the 3-D model in relation with a generative document, the projection plane becomes the plane of the screen. The system can display a visualization of the projection of the model in plane of the screen without generating a fully computed projection. Display of the visualization is more efficient in processing time as compared to a fully computed projection.

The system can also display a graphical manipulator which, in the preferred embodiment, can generally take a form including a circular central region with a button in the middle, wherein clicking on the button can be used as a command to the system requesting creation of the projection.

Generally, in another aspect the graphical manipulator software tool can include quadrants, wherein each quadrant is associated with a direction in relation to an orthogonal axis. A programmable interactive device can correspond with each quadrant and be responsive to activation by a pointing device, such as clicking the button of a mouse. The four quadrants can be defined as left, right, up and down: Clicking on a quadrant can cause the projection plane to rotate by 90°, or other predetermined amount, around two orthogonal axes of the model in the projection plane. The direction of rotation will correlate with the quadrant selected.

In another aspect a software tool including a pin, or other user interactive device tracking the circumference of a circle can be displayed on a computer screen with a computer generated model. A user can select the pin with a pointing device and rotate it about the displayed circle. Rotation of the pin can cause the projection plane of a computer generated model to rotate about an axis which is perpendicular to the projection screen. In addition, this invention can include an interactive menu for selecting a mode of operation governing the rotation of the pin and the corresponding rotation of the projection plane. In general, rotation options can include free hand rotation, incremental rotation and entering an angle of rotation Activation of the pin can allow a user to obtain all the possible views of the model from which they can select a desired view that can appear on a final drawing. After selection of a desired view, the system can create the full projection.

DETAILED DESCRIPTION OF THE INVENTION

Figure 1:
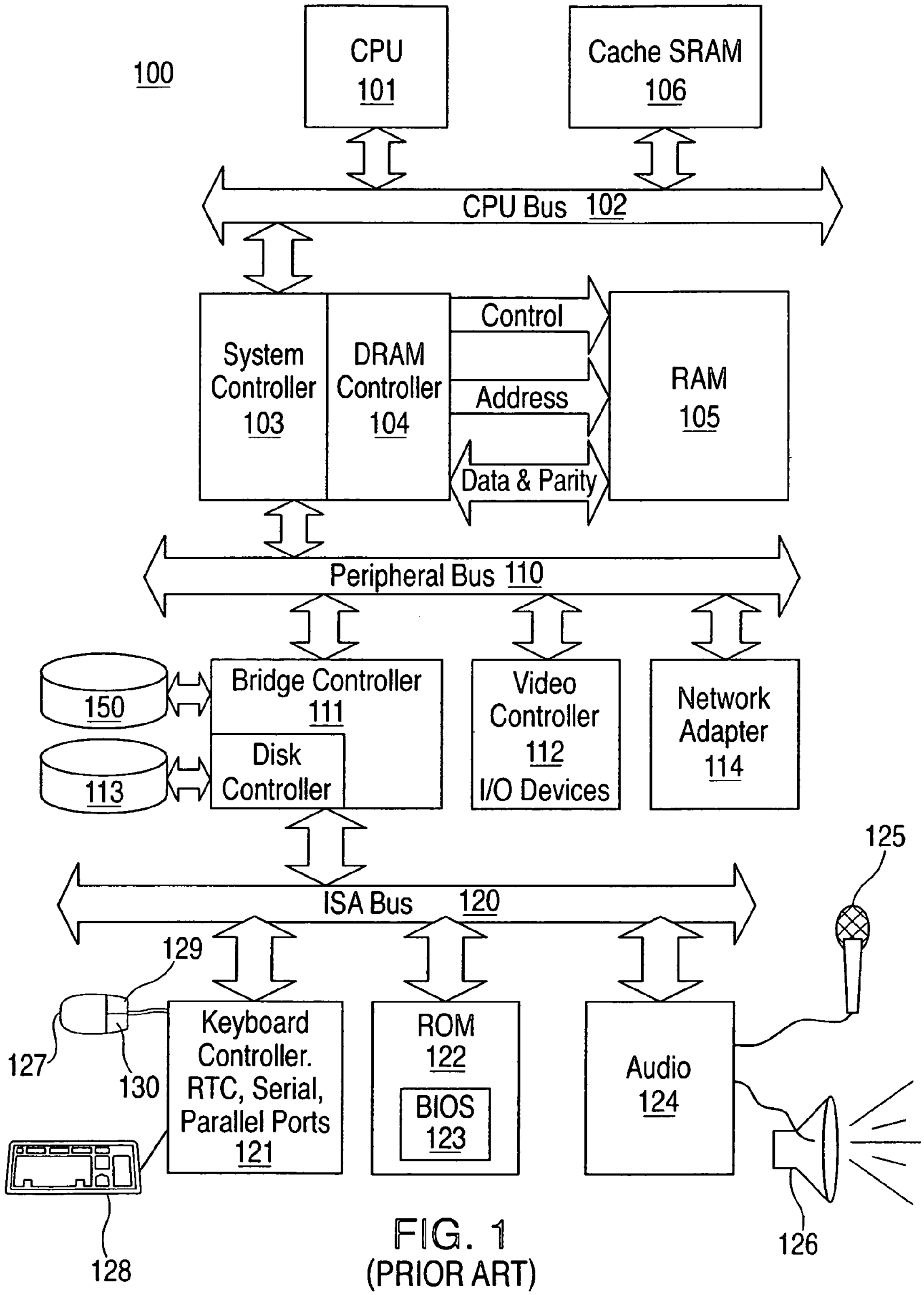
FIG. 1 is a block diagram of a computer system.

Referring to FIG. 1 physical resources of a computer system 100 are depicted. The computer 100 has a central processor 101 connected to a processor host bus 102 over which it provides data, address and control signals. The processors 101 may be any conventional general purpose single-chip or multi-chip microprocessor such as a Pentium® series processor, A K6 processor, a MIPS® processor a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 114, a video display controller 112 coupled to a video display 115, and a keyboard and mouse controller 113 can be coupled to a peripheral bus 110 and controlled by the processor 101. The computer system can include a connection to a computer system network, an intranet or an internet. Data and information may be sent and received over such a connection.

The computer 100 can also include nonvolatile ROM memory 107 to store basic computer software routines. ROM 107 may include alterable memory, such as EEPROM (Electronically Erasable Programmable Read Only Memory), to store configuration data. BIOS routines 123 can be included in ROM 107 and provide basic computer initialization, systems testing, and input/output (I/O) services. The BIOS 123 can also include routines that allow an operating system to be "booted" from the disk 113. Examples of high-level operating systems are, the Microsoft Windows 98™, Windows NT™, UNIX, LINUX, the Apple MacOS™ operating system, or other operating system.

An operating system may be fully loaded in the RAM memory 105 or may include portions in RAM memory 105 , disk drive storage 114, or storage at a network location. The operating system can provide functionality to execute software applications, software systems and tools of software systems. Software functionality can access the video display controller 112 an other resources of the computer system 100 to provide two dimensional (2-D) and three dimensional (3-D) models on the video computer display 115.

Figure 2:
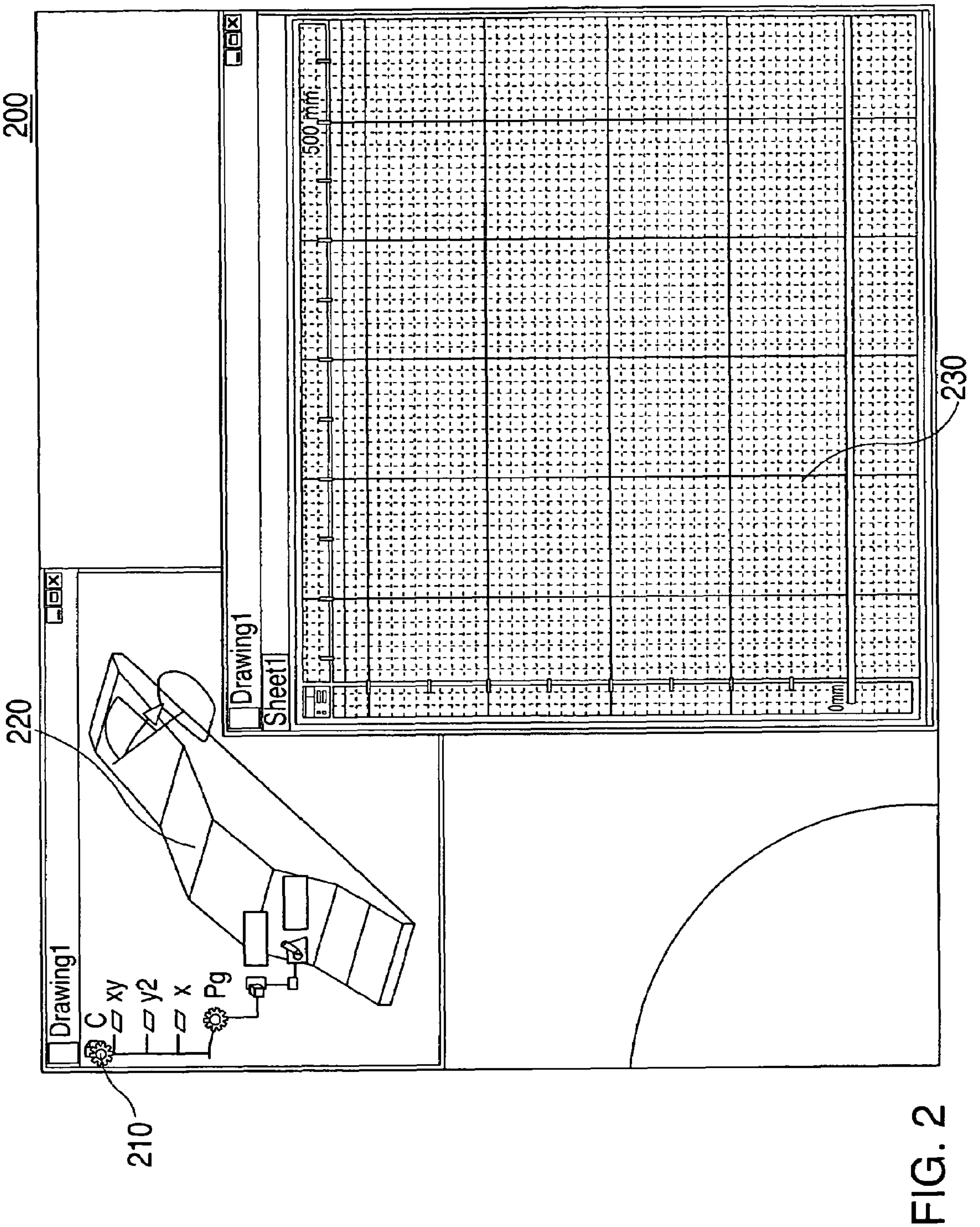
FIG. 2 is a CAD/CAM interface display.

Referring now to FIG. 2, a CAD/CAM display 200 can be viewed while running a computer aided design/computer aided manufacturing (CAD/CAM) application, a user may produce 2-D plans representing different views of a 3-D model. This production of 2-D plans can be referred to as generative drafting. A CAD/CAM display 200 can include a computer generated model 220 and a hierarchical tree 210. The hierarchical tree can be used to select a projection plane of the computer generated model 220. In the present invention a projection plane display area 230 can illustrate a visualization of the projection of the model 220.

Figure 3:
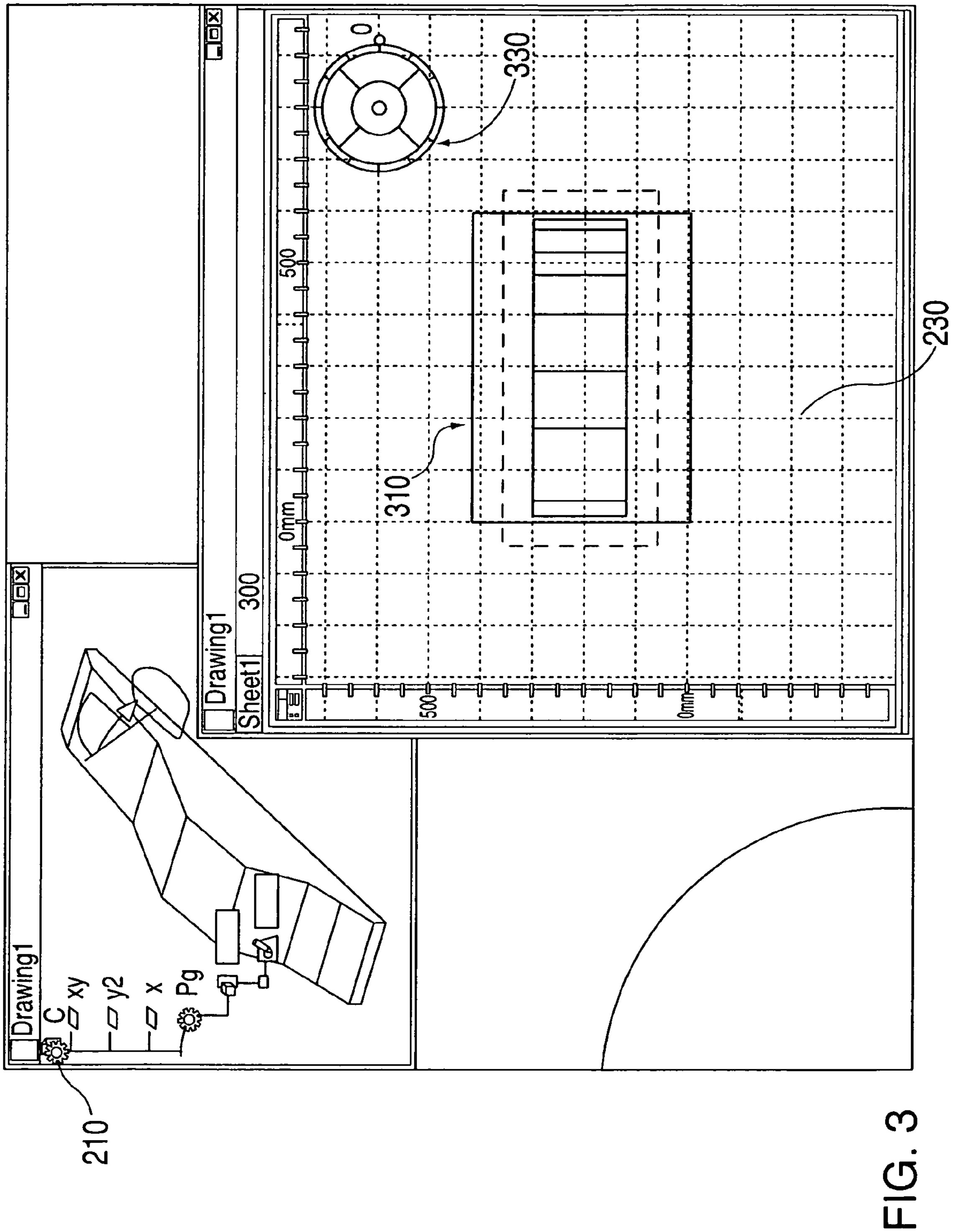
FIG. 3 illustrates a 2-D visualization of a computer generated model.

Referring now to FIG. 3, a 2-D visualization 310 of the computer generated model 220 is illustrated. The projection plane of the visualization 310 corresponds to the upper surface of the model 220 (i.e., the roof of the car). The visualization 310 allows a user to visualize a particular view of the model 220. Processing required by the computer system 100 to provide the visualization is greatly reduced as compared with the production of a drafting document with full drafting data. The visualization 310 can provide pixel data only for the display 300. Limiting data to pixel data reduces processing time. In the case of complex model structures, production of full drafting data can place a heavy processing load on the computer system 100 and require a relatively large amount of time.

A graphical manipulator software tool 330 can also be displayed in a projection plane display area 230.

Figure 4:
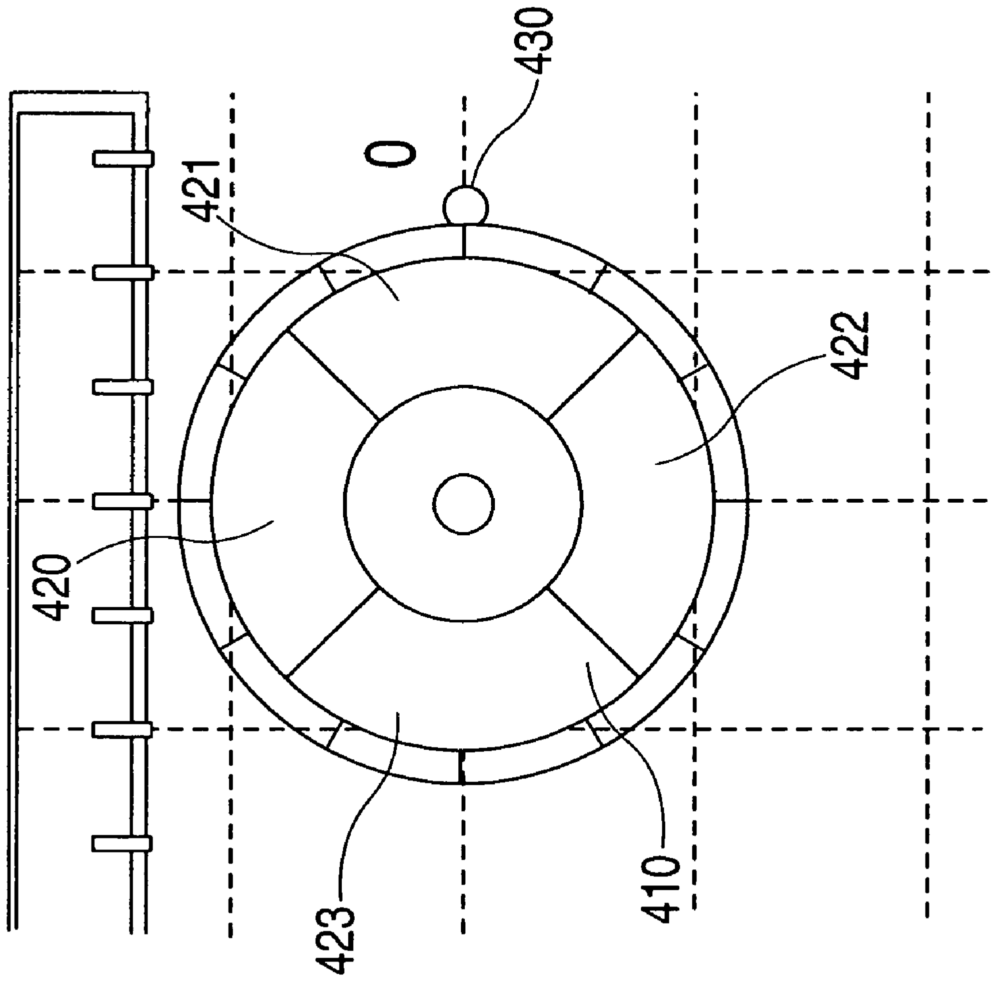
FIG. 4 is an exemplary illustration of a manipulator tool.

Referring now to FIG. 4, the manipulator tool 330, can include a central region 410 that acts as a button or other user interactive device. This central region button 410 can be used to issue a command to the computer system 100 requesting creation of the projection plane display 310. Activation of the button 410 can be accomplished by positioning a cursor over the button 410 and clicking a mouse or other pointing device.

The manipulator tool 330 can also include four quadrants 420, 421, 422 and 423. These quadrants 420-423 can act as buttons or other interactive software devices. Each quadrant can correspond with a direction, such as left, right, up and down. Clicking on a quadrant can cause the projection plane to rotate by a predetermined amount, such as 90 degrees, around one of the two orthogonal axis of the model defining the current projection plane. The amount of rotation can be programmed into the quadrant button. The direction of the rotation can be defined by the quadrant 420-423 activated. Actions taken responsive to activation of the quadrants is discussed further below. The manipulator tool 330 can also include a pen, or other device, attached to the outer circumference of the manipulator 330. Selection of the pin 430 and driving it in a circular movement clockwise or counterclockwise can cause the projection plane to rotate about an axis which is perpendicular to the projection plane. The projection plane is congruous to the plane of the display screen. Clicking a right button of a mouse, or other alternative selection action, while a cursor is over the manipulator pin 430, can cause a rotation option menu to appear.

Figure 5:
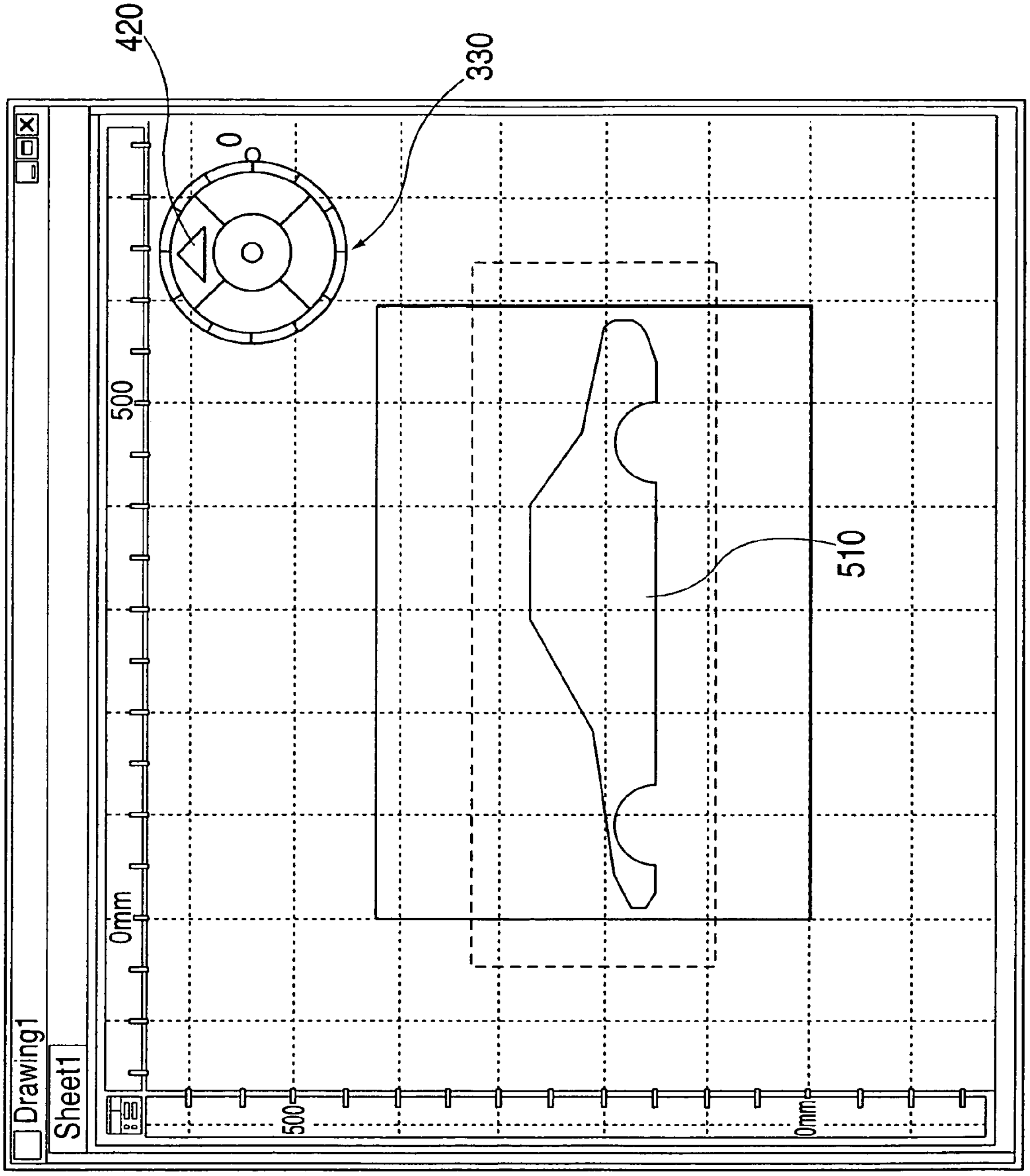
FIG. 5 illustrates a projection plane rotation effectuated by an upper quadrant of a manipulator tool.

Referring now to FIG. 5, selection of an upper quadrant 420 can cause the projection plane to rotate 90 degrees towards the top of the visualization. In the example given, the model 310 is rotated from a top view 300 to a profile view 510 following activation of the upper quadrant 420.

Figure 6:
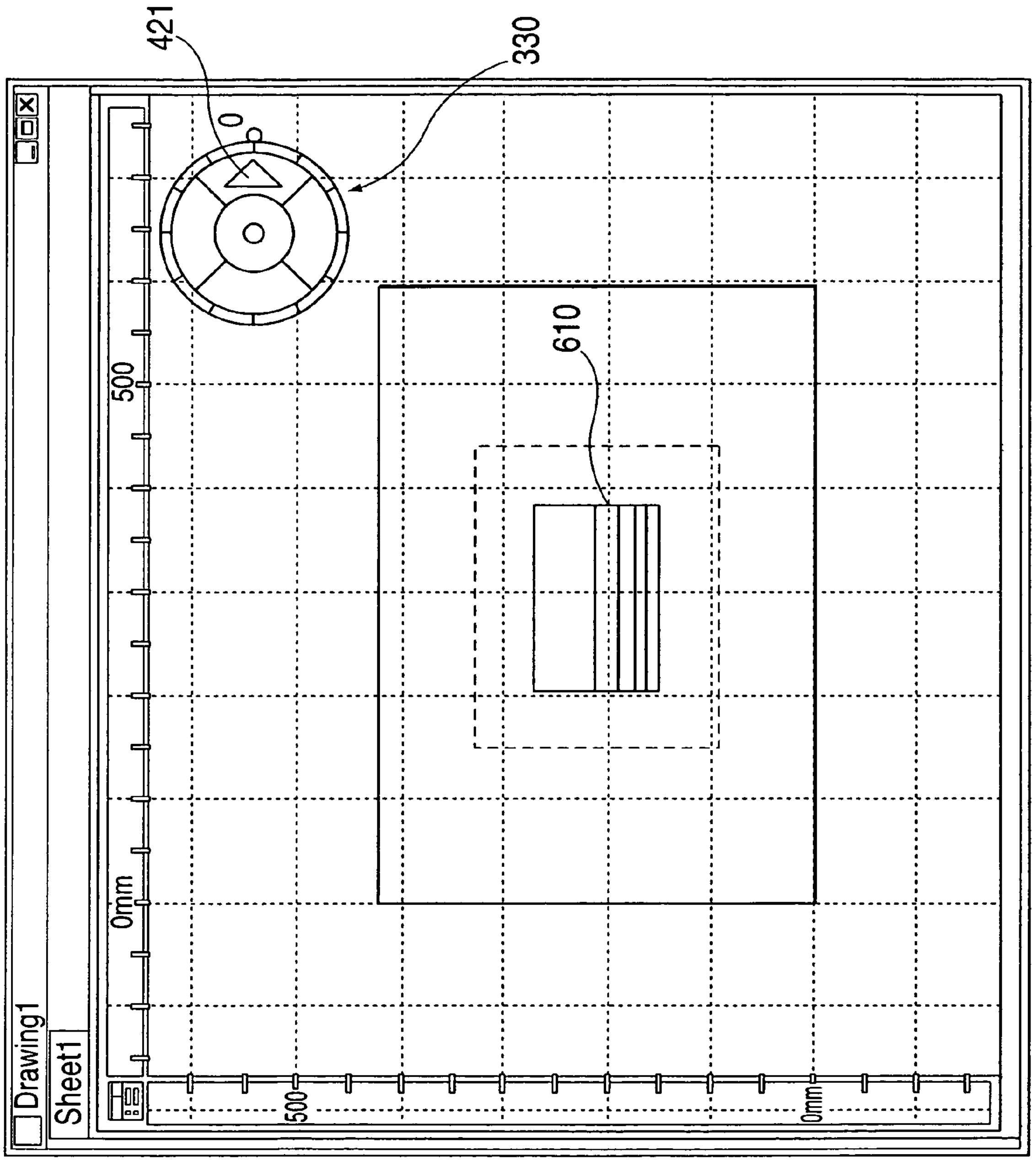
FIG. 6 illustrates a projection plane rotation effectuated by a right quadrant of a manipulator tool.

Referring now to FIG. 6, activation of a right quadrant 421 can cause the projection plane to rotate 90 degrees to the right. The resultant image 610 is a side view of the model 310.

Figure 7:
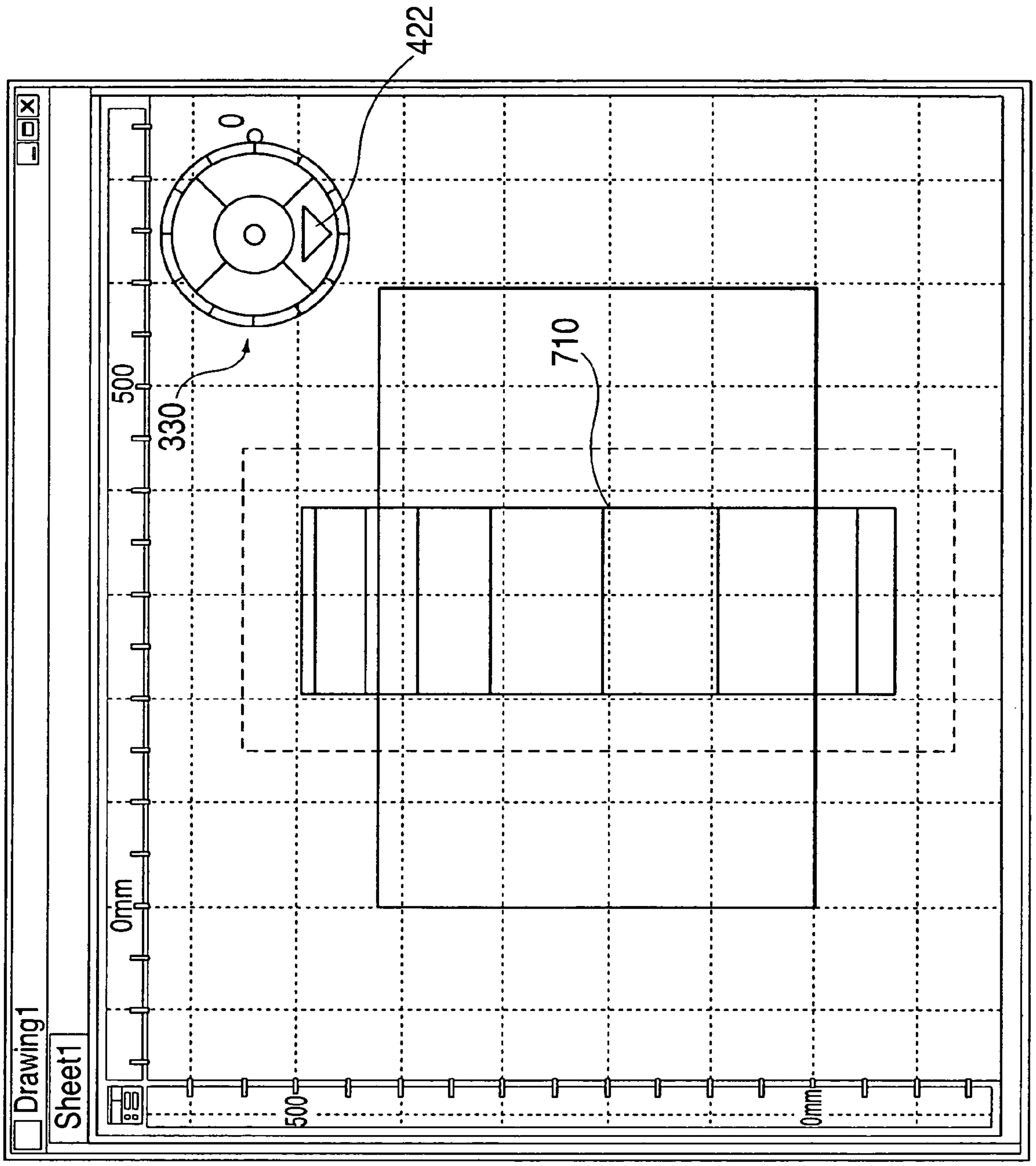
FIG. 7 illustrates a projection plane rotation effectuated by a lower quadrant of a manipulator tool.
Figure 8:
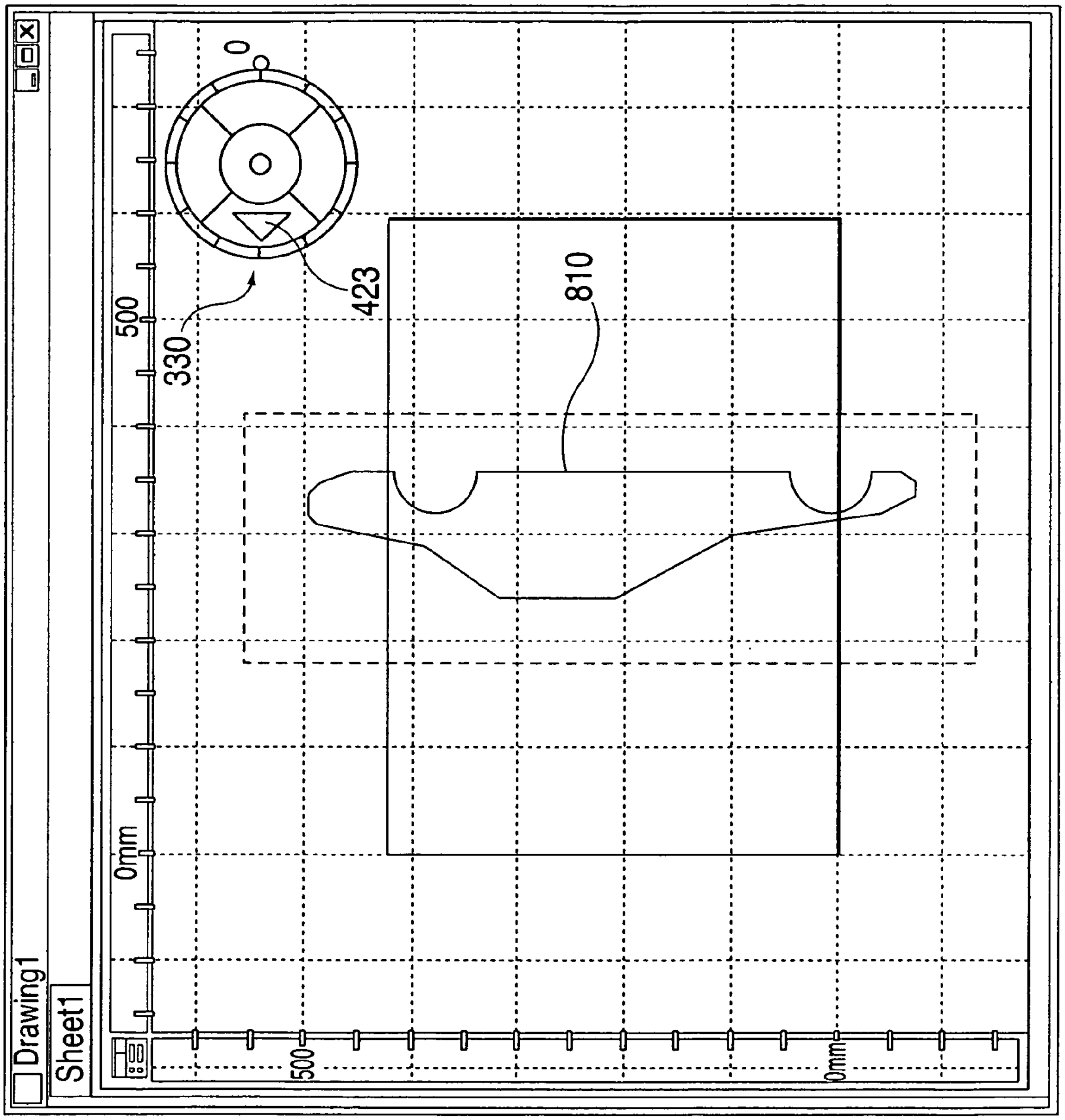
FIG. 8 illustrates a projection plane rotation effectuated by a left quadrant of a manipulator tool.

Referring now to FIG. 7, activation of the a lower quadrant 422 can cause the projection plane to rotate 90 degrees in the downward direction. The resultant image 710 is a bottom up view of the model 310. Similarly as illustrated in FIG. 8, activation of the left quadrant will cause the projection plane to rotate 90 degrees to the left. In the example given the resultant image 810 is a profile of the previous image 710.

Figure 9:
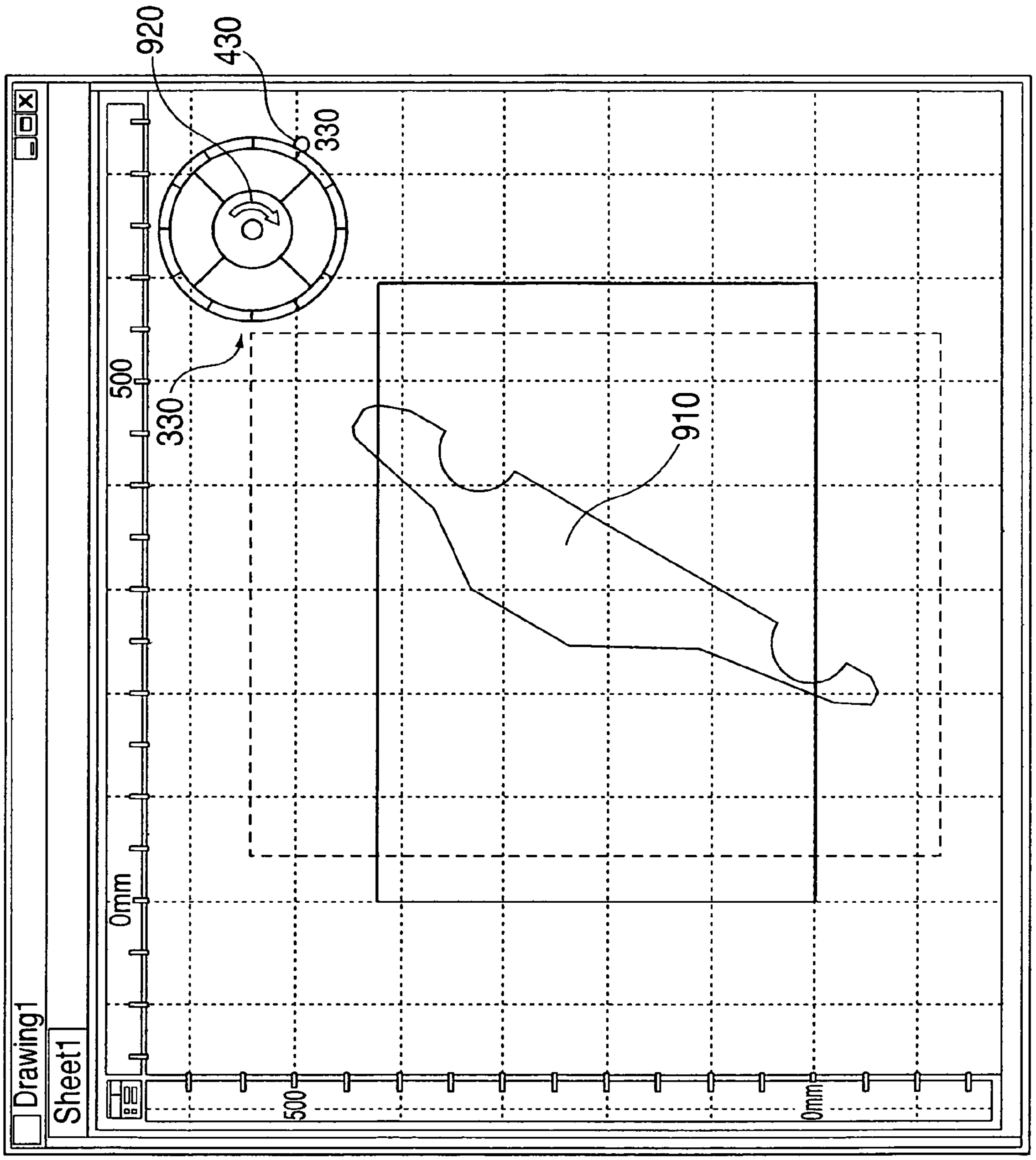
FIG. 9 illustrates a projection plane rotation effectuated by rotation of a manipulator pin to a 330° position.

Referring now to FIG. 9, rotation of the manipulator pin 430, can cause the projection plane to rotate around an axis which is perpendicular to the projection plane. In the example given, the resultant image 910 has been rotated to the 330 degree position from the previous image 810. Rotation of the pin 430 can be accomplished, for example, by selecting the pin with a cursor directed by a mouse, or other pointing device, and dragging the pin 430 around the circumference of the manipulator tool 330.

Figure 10:
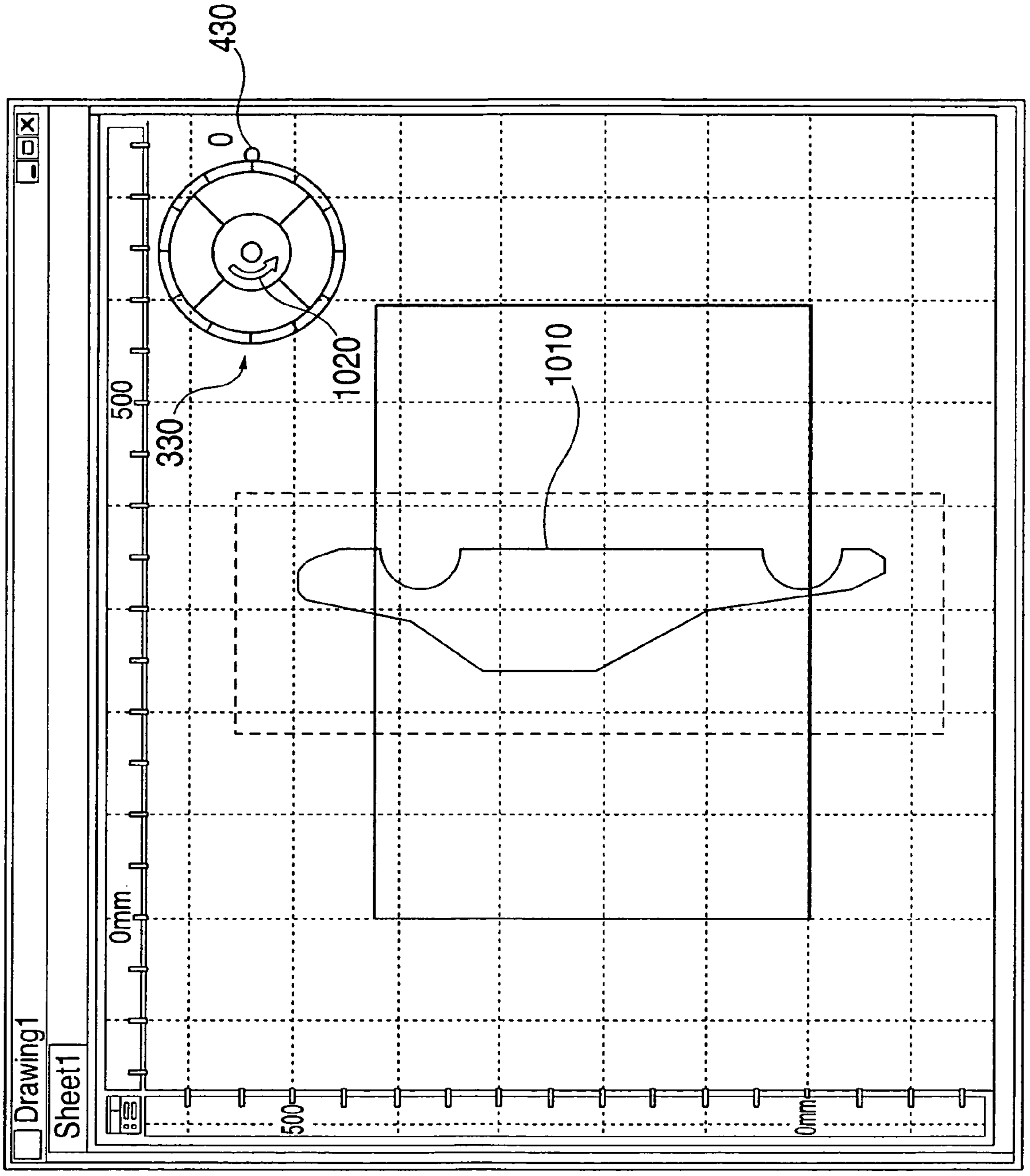
FIG. 10 illustrates a projection plane rotation effectuated by rotation of a manipulator pin to a 0° position.

Referring now to FIG. 10, the manipulator pin 430 has been returned to the zero degree position. The resultant image 110 shows the projection plane restored to the same position as in FIG. 810.

In addition to the manipulator pin 430, rotational arrows 920 and 1020 can be utilized to rotate the projection plane. In one embodiment, the rotational arrows can be situated around the central region button 410, and interior to the quadrants 421-424. Each rotational arrow can act as a user interactive device wherein activation of the device with a cursor controlled by a pointing device will cause the projection plane to rotate by a predetermined number of degrees. In one preferred embodiment, the projection plane can be preset to rotate 30° in the direction indicated by the arrow. Direction of rotation can include clockwise arrows 920 and counter-clockwise arrows 1020.

Figure 11:
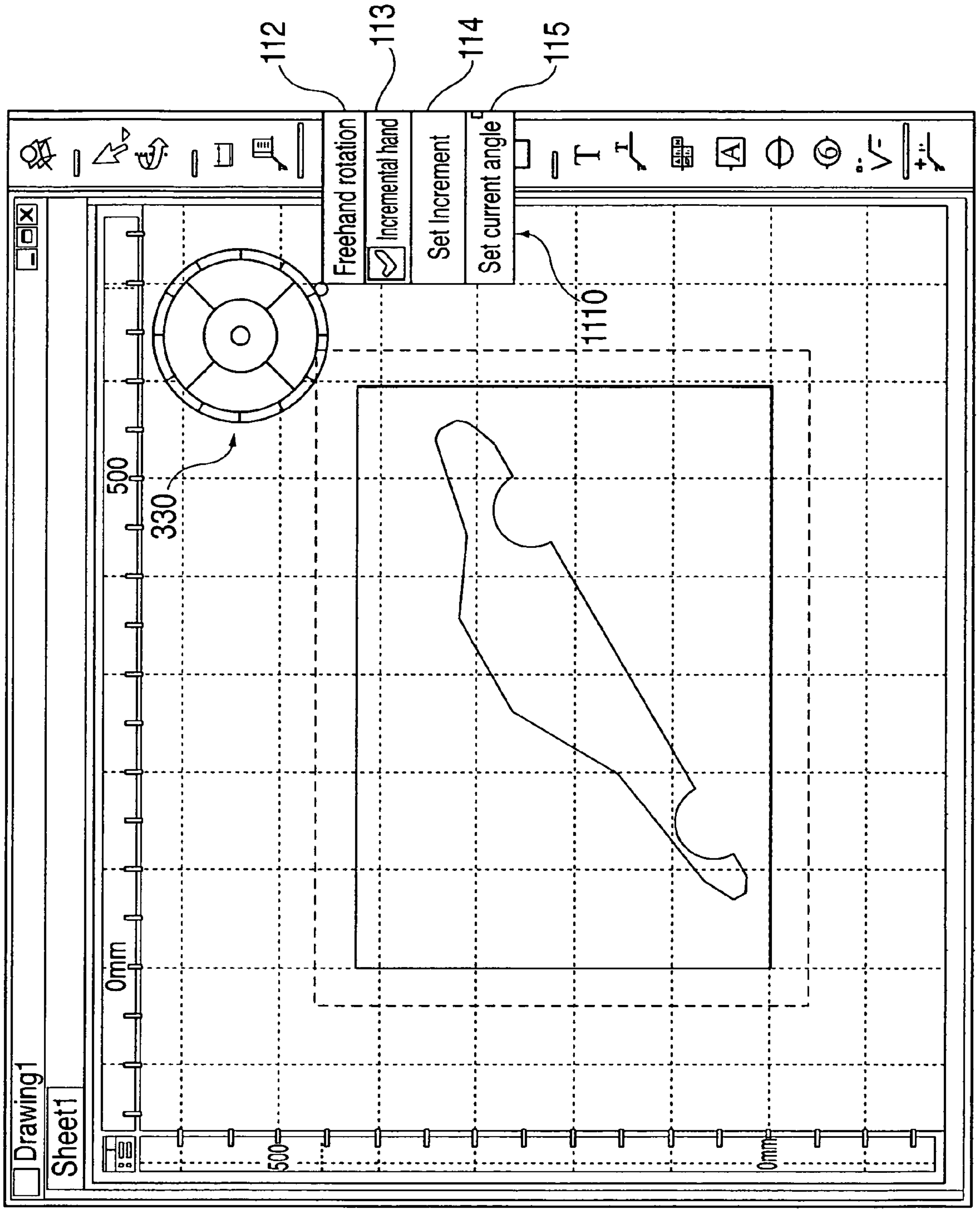
FIG. 11 illustrates a CAD/CAM display with a rotation option menu.

Referring now to FIG. 11, clicking the right button of a mouse, or other alternative selection action, while a cursor is positioned over the manipulator pin 430, can cause a rotation option menu 1110 to be displayed. The rotation option menu 1110 can include various programmable options for implementing the rotation of the projection plane with the manipulator pin device 430. Programmable rotational options can include, free hand rotation 1120, incremental hand rotation 1130, set increment 1140, and set to current angle 1150.

Figure 12:
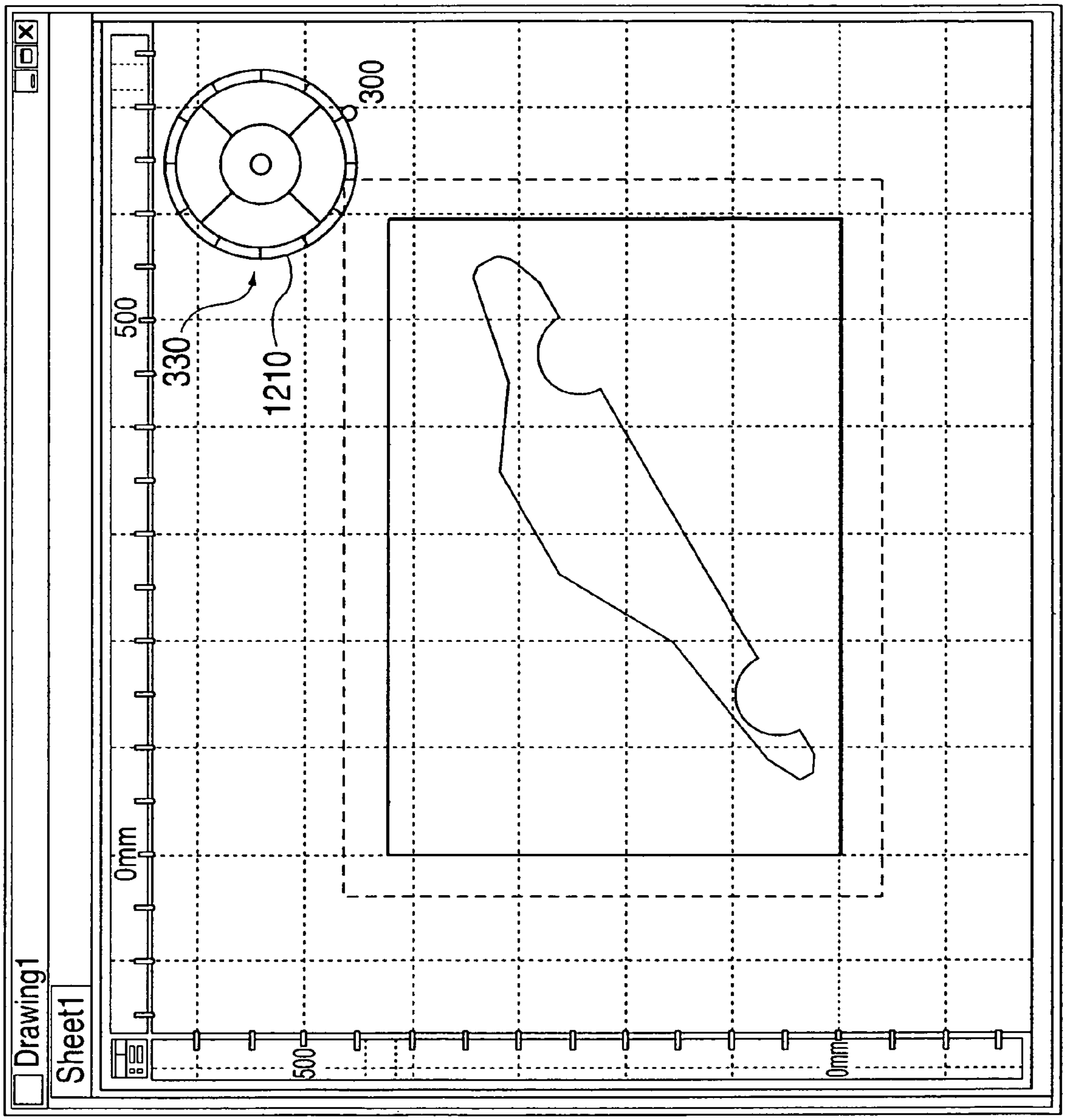
FIG. 12 illustrates an exemplary manipulator tool with an incremental rotation option selected.

Referring now to FIG. 12, incremental hand rotation 1130, can be illustrated with regularly spaced markings 1210 around the perimeter of the manipulator tool 330. The perimeter markings 1210 provide a visual indication to the user that the manipulator pin 430 is in the incremental hand rotation mode 1130.

Figure 13:
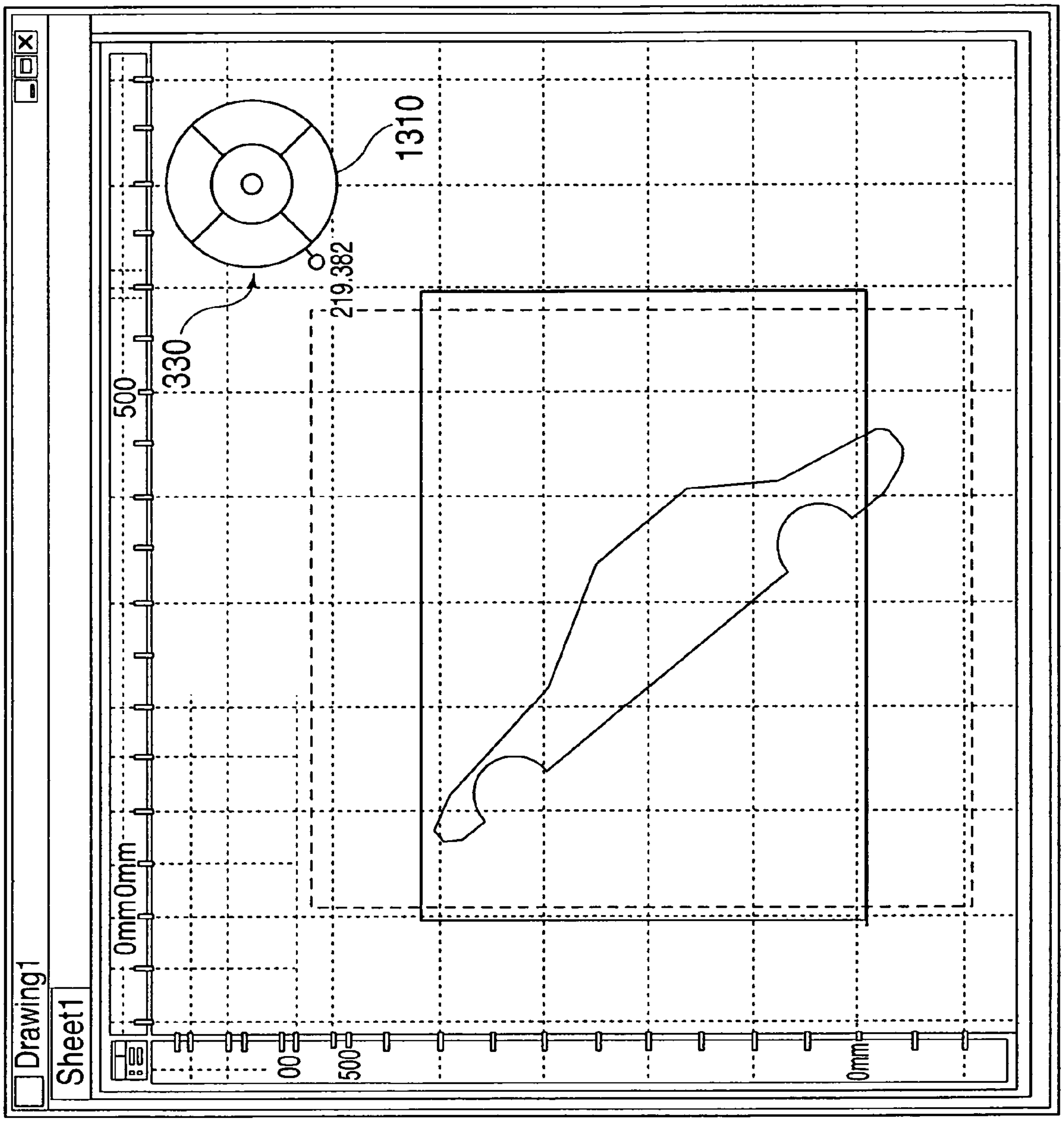
FIG. 13 illustrates an exemplary manipulator tool with a free hand rotation option selected.

Referring now to FIG. 13, free hand rotation 1120, can be similarly represented with a smooth surface 1310 around the circumference of the manipulator tool 330. Free hand rotation can allow the user to freely move the pin and thus freely define the amount of rotation desired.

Incremental hand rotation 1130 can cause the pin to move by increments. A default value for each increment can be 180 degrees divided by 16 or 11.25 degrees of movement for each increment. A set increment option 1140 is available from the menu 1110. Using the set increment option 1140, a user can change the value of each increment. A user can also select the set current angle option 1150 from the menu 1110 to set a current angle to a desired value.

Referring now to 14, selecting the set current angle option 1150 can cause a current angle menu 1410 to display. The current angle menu 1410 can include frequently selected values such as zero degrees, ninety degrees, 180 degrees, 270 degrees or other values important to the user. In addition a set angle value 1420 is available. The set angle value 1420 allows a user to key in a degree value.

Figure 14:
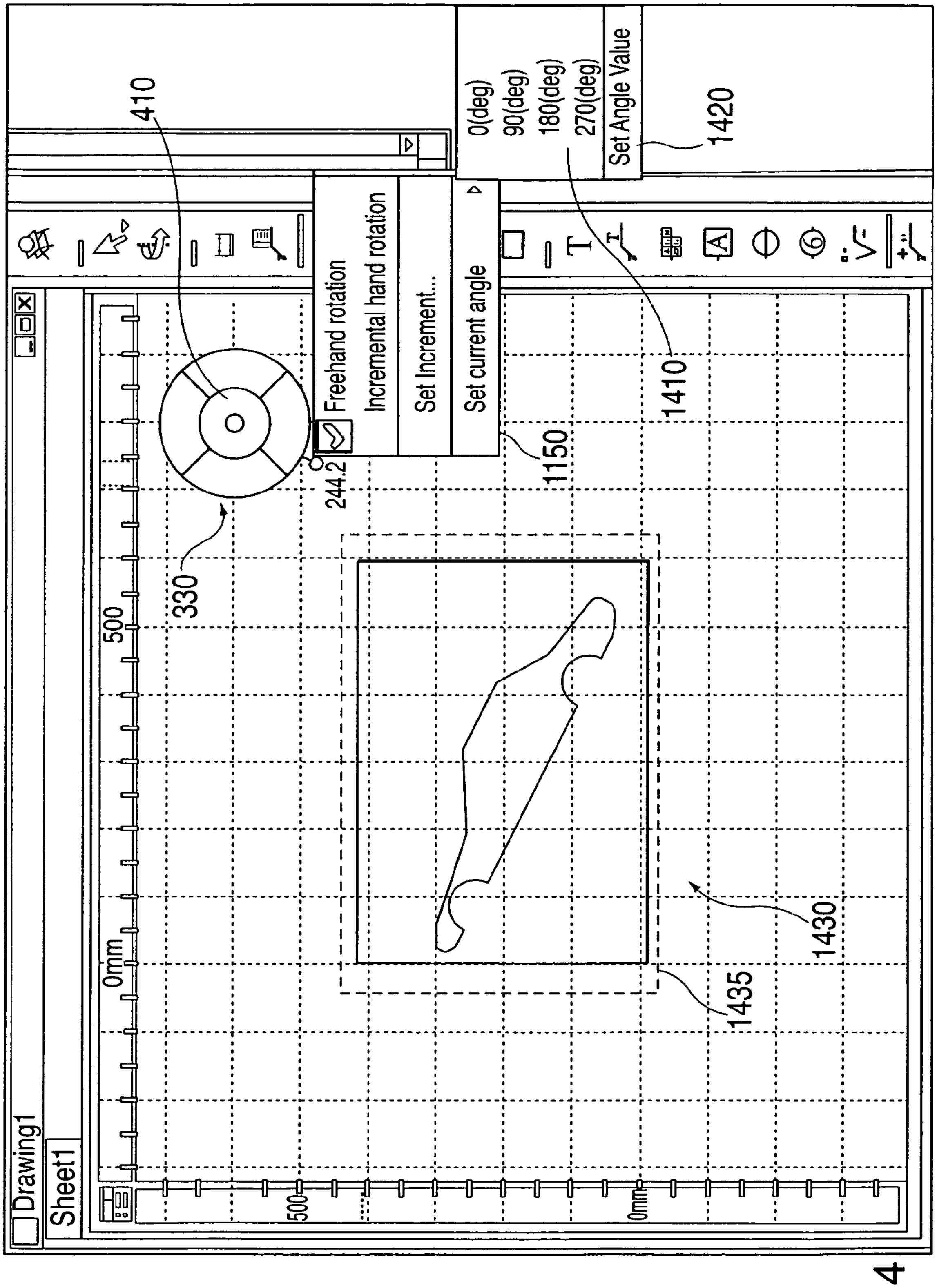
FIG. 14 illustrates an exemplary manipulator tool with a set current angle option selected.
Figure 15:
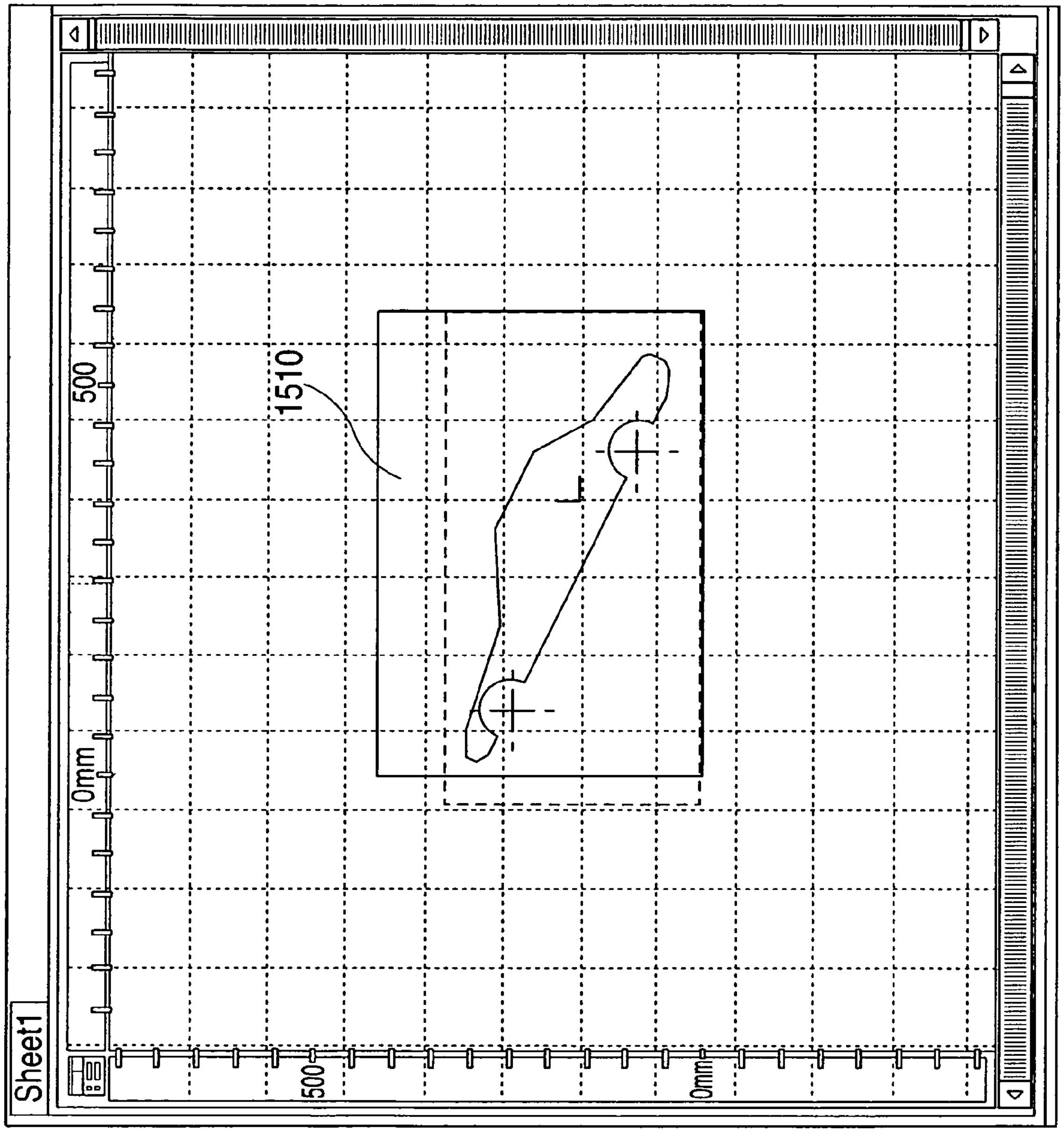
FIG. 15 illustrates an exemplary drafting document display.

Referring now to FIGS. 14 and 15, clicking on a circular central region 410 in the graphical view manipulator can cause the system to create a projection document 1510 based on the visualization currently occupying the display screen. In addition to activating a user interactive device serving as the center button 410 in the graphical view manipulator 330, a user may click on the display screen in the area 1430 exterior to the dashed line 1435 surrounding the visualization image.

Figure 16:
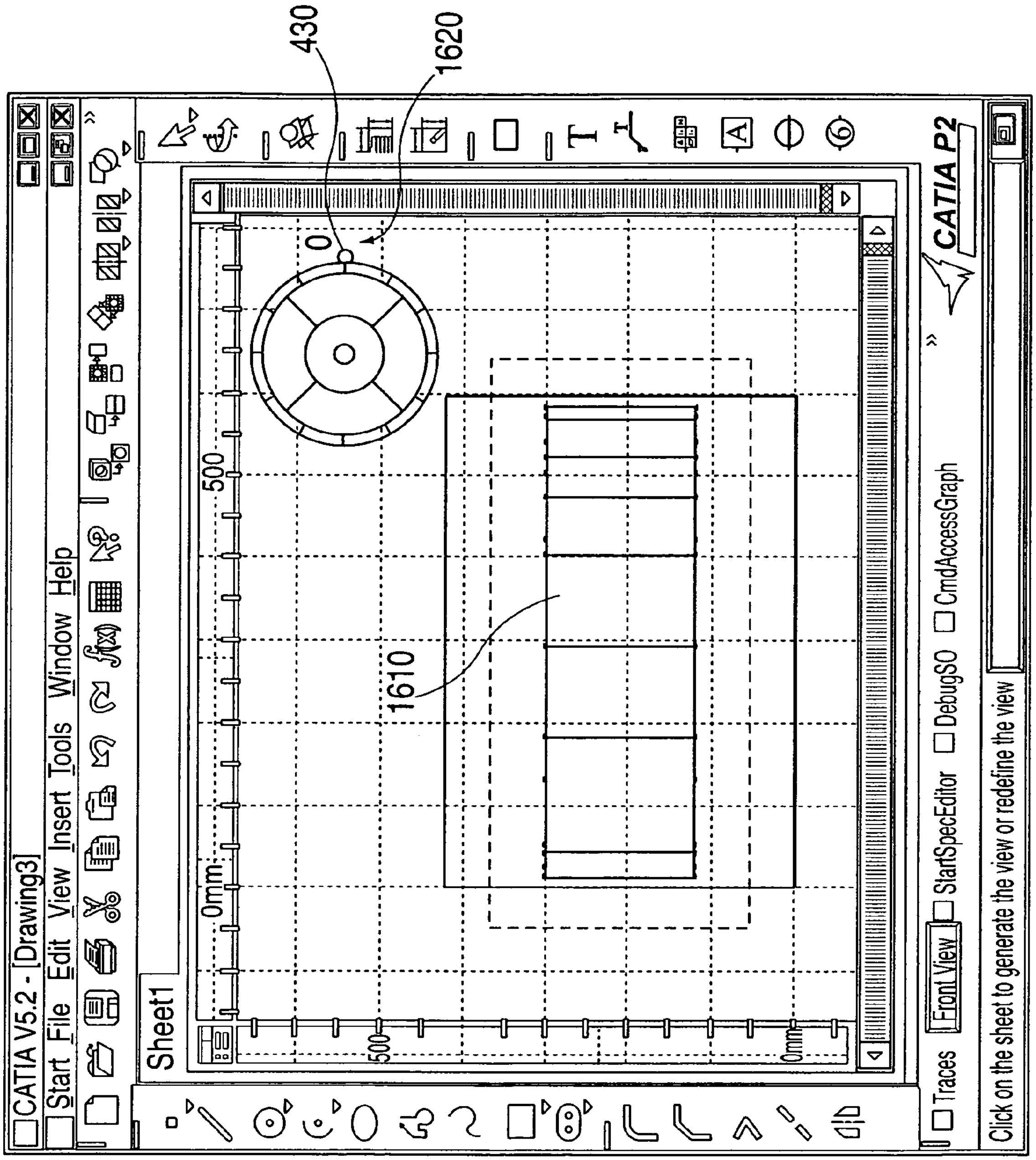
FIG. 16 illustrates a top view of an object to be formed into an isometric view.

Referring now to FIG. 16, in one preferred embodiment, a view manipulator tool can be used to expeditiously form an isometric view of a part being modeled without returning to the 3-D view. A 2D view, such as the top view 1610 of an object, can begin with a manipulator pin 430 set to the zero degree mark 1620.

Figure 17:
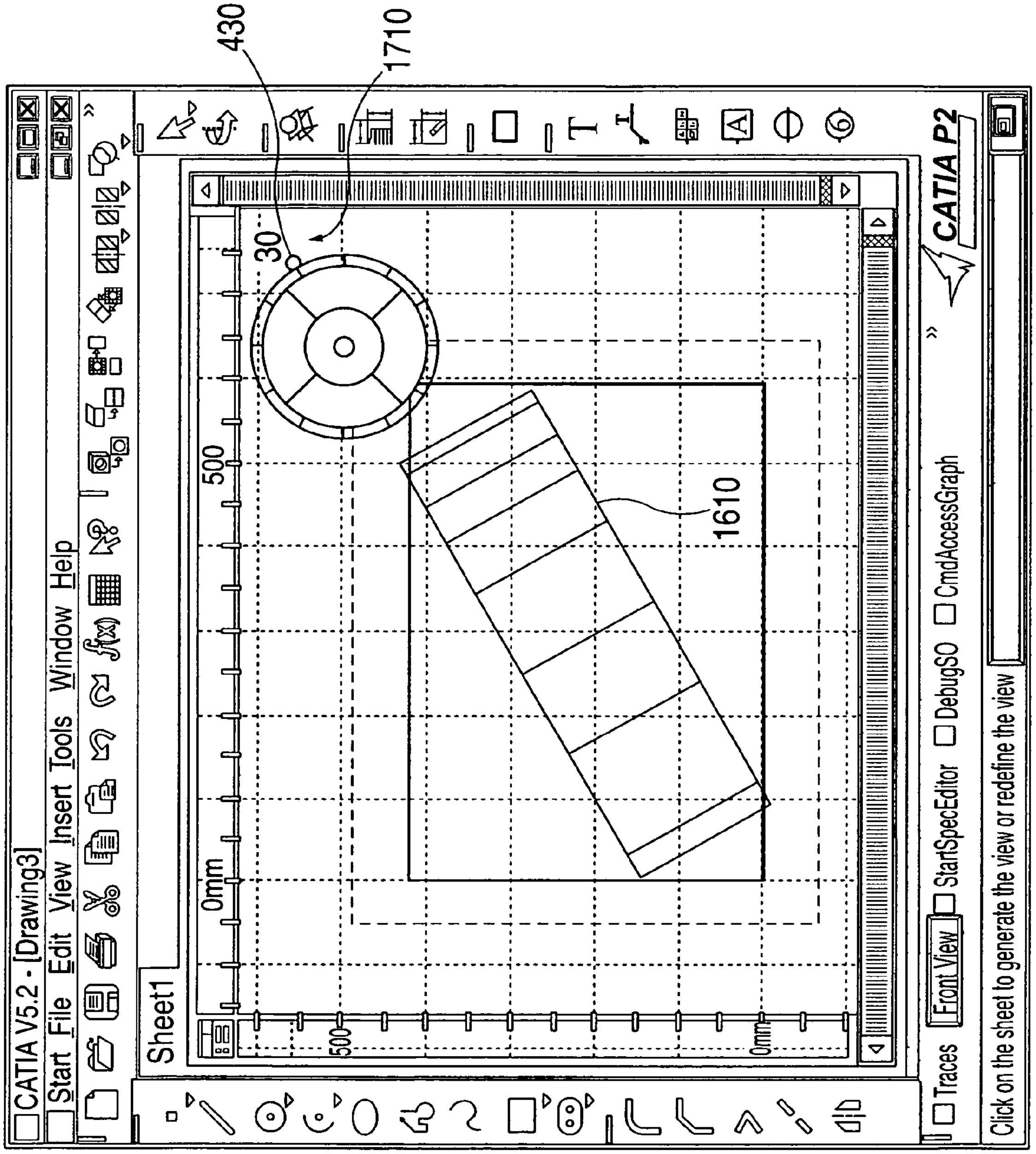
FIG. 17 illustrates an exemplary first step of forming an isometric view.
Figure 18:
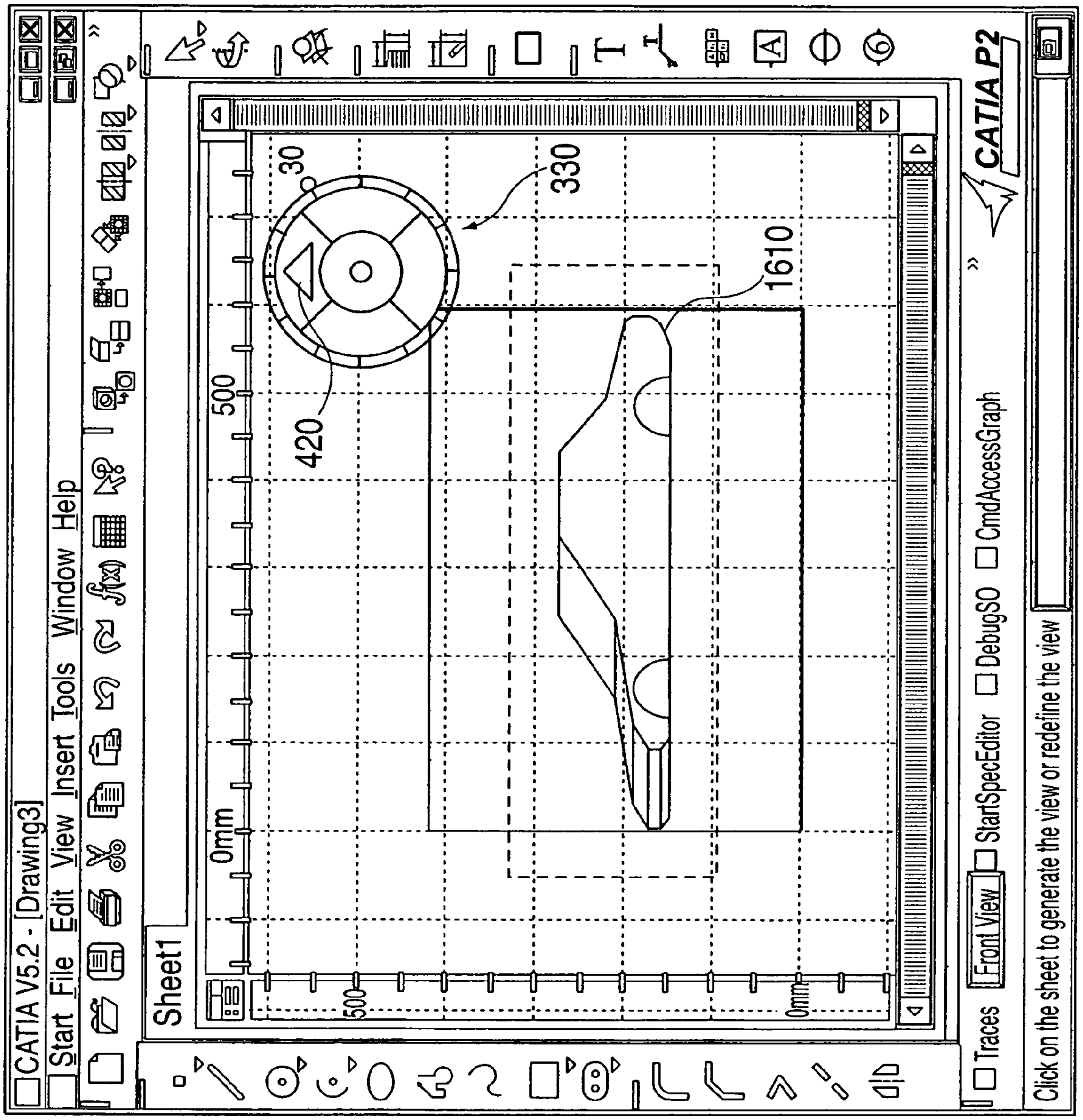
FIG. 18 illustrates an exemplary second step of forming an isometric view.

Referring now to FIG. 17, using the pin 430 or a manipulator arrow 920, the object can be rotated for example 30 degrees. The object should be rotated less to 90 degrees to ultimately achieve an isometric view. The manipulator tool 330 can indicate when the objet 1610 has been rotated 30 degrees by positioning the pin 430 at the 30 degree mark 1710. After an initial rotation of other than 90 degrees, a quadrant such as the upper quadrant 420 can be activated whereby the projection plan of the object 1610 is rotated by 90 degrees around the one of the two orthogonal axis.

Figure 19:
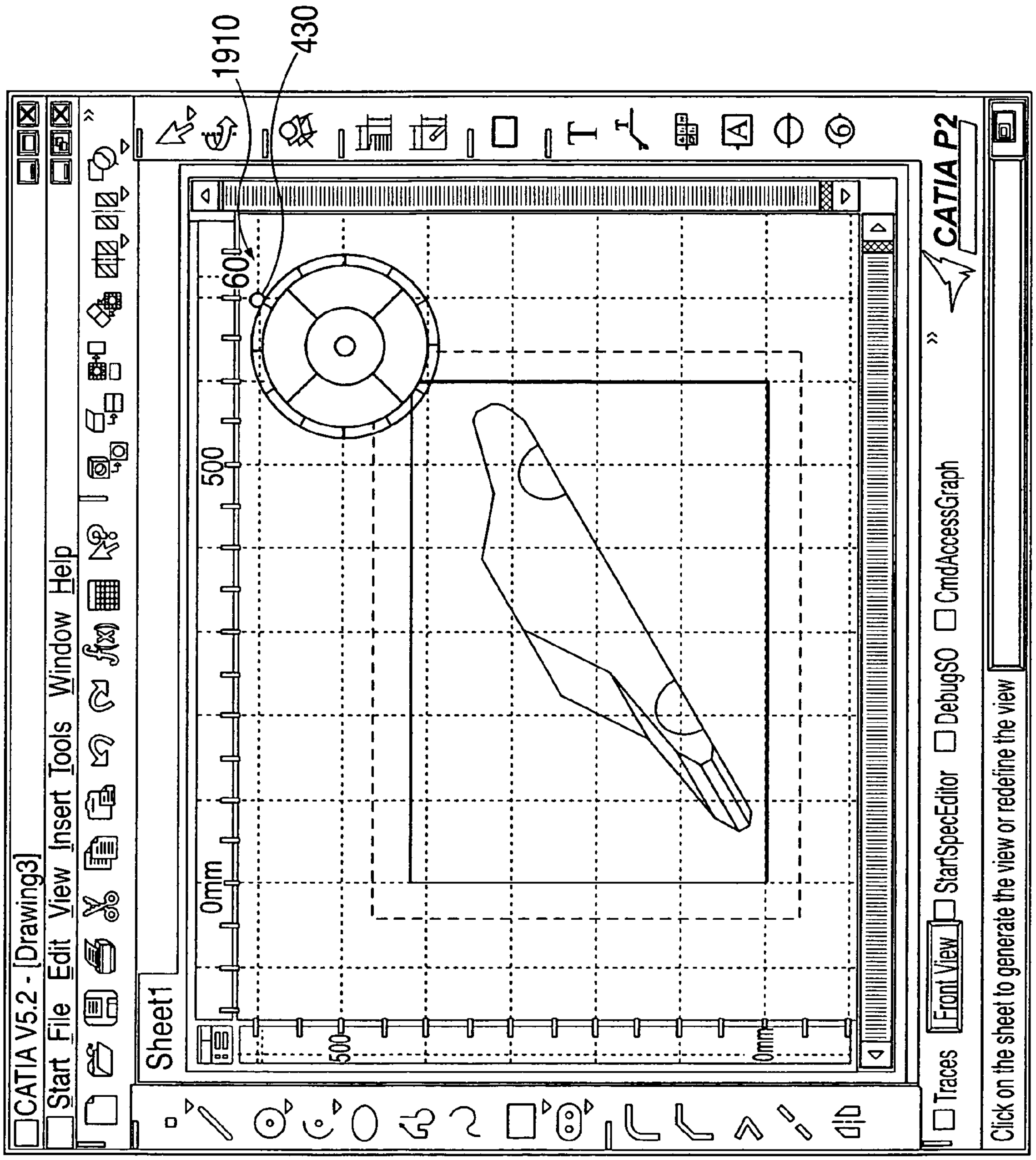
FIG. 19 illustrates an exemplary third step of forming an isometric view.

Referring now to FIG. 19, the projection plan other than 90 degrees. For example the manipulator pin 430 can be moved to the 60 degree position 1910.

Figure 20:
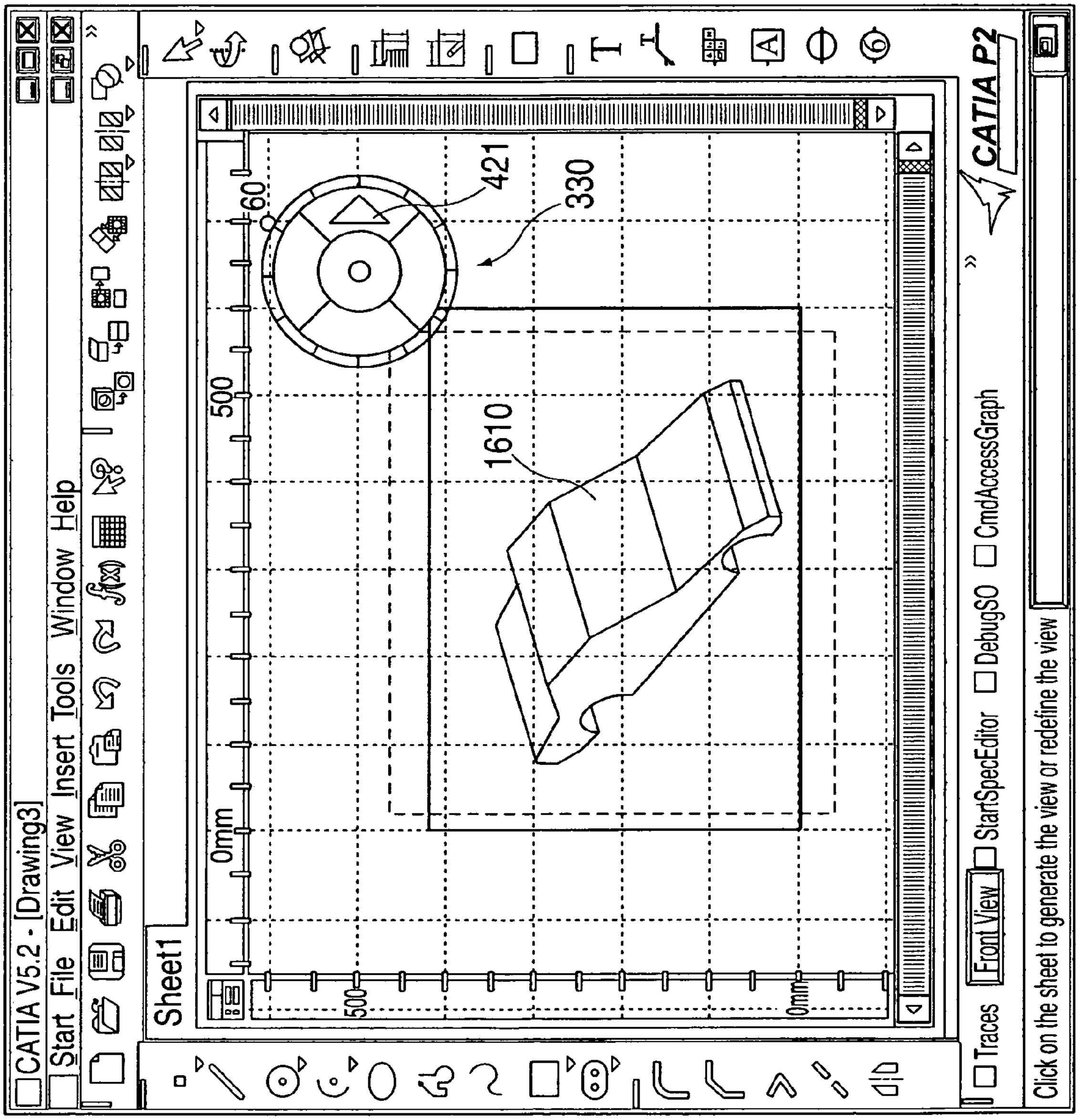
FIG. 20 illustrates an exemplary fourth step of forming an isometric view.
Figure 21:
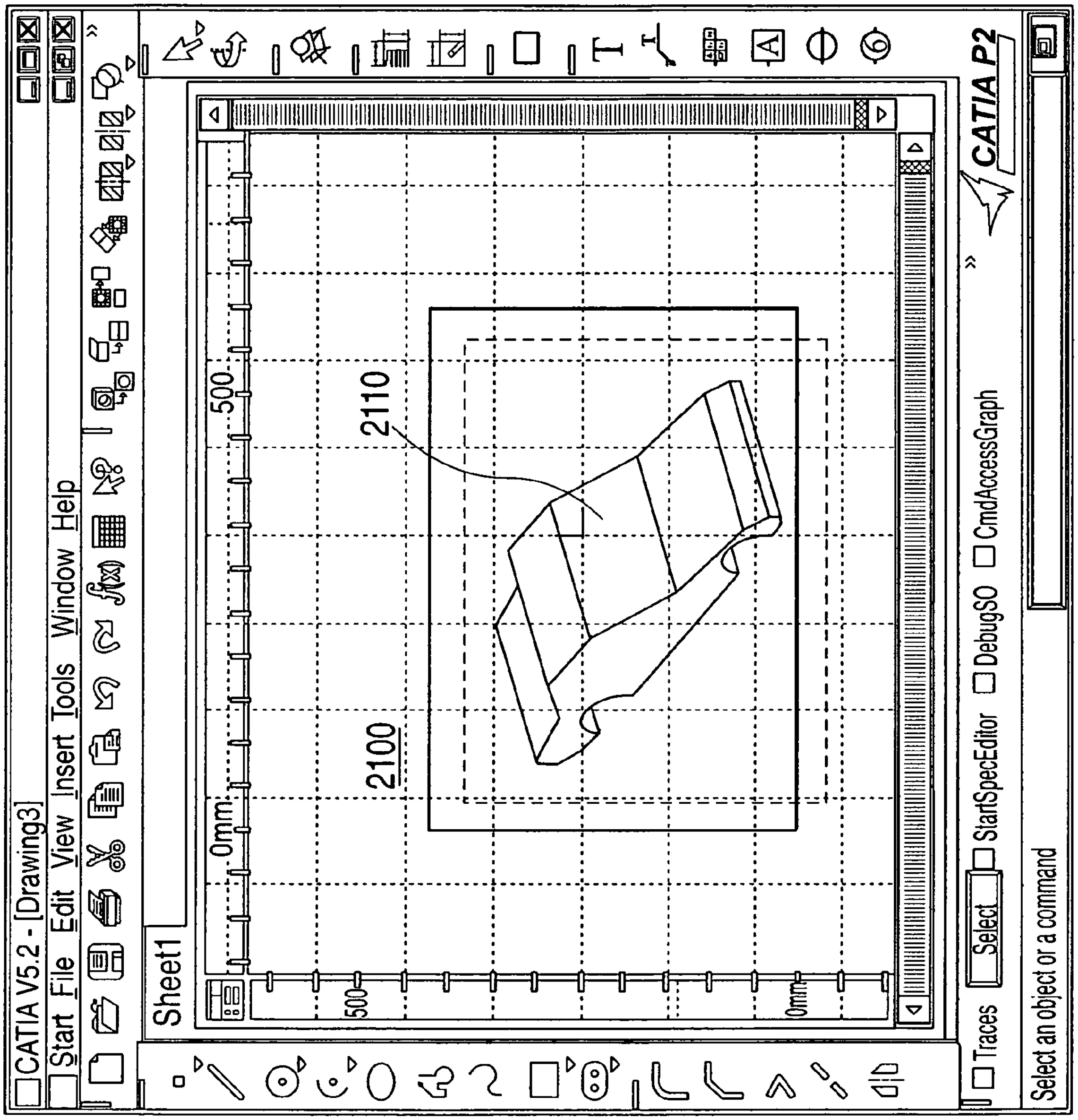
FIG. 21 illustrates a drafting document display of the resultant isometric view.

Referring now to FIG. 20, activation of a quadrant other than the initial quadrant such as the right quadrant 421, can cause the projection plane to display as an isometric view 2010. Referring now to FIG. 21, activation of the central region button 410 can command the computer system 100 to create a projection display of the isometric view 2100.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. It will be understood that various modifications may be made without departing from the spirit and scope of the invention. Therefore, other implementations are within the scope of the following claims.

What is claimed is:

1. A computer system operation method for displaying a computer-generated two-dimensional projection of a three-dimensional model of an object on a display in a desired plane, the method comprising the steps of:

converting the computer-generated three-dimensional model of the object to a computer-generated two-dimensional visualization of the object, said two-dimensional visualization of the object being processed by said computer without generating full drafting data, said computer-generated three-dimensional model of the object being in one of a plurality of projection planes and said computer-generated two-dimensional visualization of the object being in a first selected projection plane from said plurality of selection planes;

receiving a second selected projection plane for said two-dimensional visualization, wherein said second selected projection plane is different from said first selected projection plane;

rotating said two-dimensional visualization in order to display said two-dimensional visualization in said second selected projection plane;

displaying said two-dimensional visualization in said second selected projection plane; and generating a fully computed two-dimensional projection of said three-dimensional model in said second selected projection plane after said two-dimensional visualization in said second selected projection plane has been displayed, said fully computed projection of said three-dimensional model being processed by said computer generating full drafting data, wherein computer processing time of said two-dimensional visualization of the object being processed without generating full drafting data is substantially reduced with respect to computer processing time of said fully computed projection of said three-dimensional model being processed generating full drafting data, thereby substantially improving efficiency in displaying said computer-generated two-dimensional projection of a three-dimensional model of an object on a display in a desired plane.

2. The method of claim 1 wherein the display of the two dimensional visualization is limited to pixel data.

3. The method of claim 1, wherein said steps of receiving a second selected projection plane and displaying said two-dimensional visualization in said second selected projection plane are iteratively repeated, and wherein the step of generating the fully computed two-dimensional projection of said three-dimensional model of the object in said second selected projection plane includes the step of:

receiving an approval for said second selected projection plane; and displaying said fully computed two-dimensional projection of said three-dimensional model in said second selected projection plane after receiving said approval.

4. The method of claim 1, wherein the step of receiving a second selected projection plane includes the step of:

providing a manipulator tool button for selecting said second projection plane.

5. The method of claim 4, wherein said manipulator tool includes a plurality of quadrants, each of said plurality of quadrants representing a predetermined number of degrees of rotation in a predetermined direction around an orthogonal axis, wherein the step of receiving a second projection plane includes the step of:

receiving a selected one of said plurality of quadrants; and rotating said first selected projection plane said predetermined number of degrees and in said predetermined direction around said orthogonal axis associated with said selected quadrant.

6. The method of claim 5, wherein said manipulator tool includes a programmable interactive button and wherein the step of displaying said two-dimensional visualization in said second selected projection plane includes the step of:

displaying said two-dimensional visualization in said second selected projection plane in response to an activation of the programmable interactive button.

7. A projection plane manipulator tool for manipulating a projection plane wherein a computer-generated three-dimensional model of an object is converted to a two-dimensional visualization of the object, said two-dimensional visualization of the object being processed by said computer without generating full drafting data, and wherein:

said two-dimensional visualization of the object is displayed on a computer screen in a first selected projection plane, said first selected projection plane associated with said two-dimensional visualization being manipulated to a second selected projection plane, wherein said second selected projection plane is different from said first selected projection plane;

said two-dimensional visualization is rotated in order to display said two-dimensional visualization in said second selected projection plane; and wherein said three-dimensional model is thereafter projected in said second selected projection plane by generating a fully computed two-dimensional projection of said three-dimensional model, said fully computed projection of said three-dimensional model being processed by said computer generating full drafting data, and said projection plane manipulator tool comprising:

a user interactive device tracking the circumference of a circle displayed on said computer screen, wherein selecting the interactive device and rotating it in a clockwise or counter-clockwise direction will cause said first projection plane to rotate about an axis which is perpendicular to the computer screen, and wherein computer processing time of said two-dimensional visualization of the object being processed without generating full drafting data is substantially reduced with respect to computer processing time of said fully computed projection of said three-dimensional model being processed generating full drafting data, thereby substantially improving efficiency in projecting said three-dimensional model in said second selected projection plane.

8. A computer readable storage medium having stored thereon computer executable code for displaying a computer-generated two-dimensional projection of a three-dimensional model of an object on a display in a desired plane, such that when said code is executed by a computer, it causes the computer to execute a number of steps comprising:

displaying a computer generated three-dimensional model of an object on a display in one of a plurality of projection planes;

converting the three-dimensional model of said object to a computer generated two-dimensional visualization of the object, said two-dimensional visualization of the object being processed by said computer without generating full drafting data, wherein said computer generated two-dimensional visualization is in a first selected projection plane from said plurality of selection planes;

receiving a second selected projection plane associated with said two-dimensional visualization; wherein said second selected projection plane is different from said first selected projection plane;

rotating said two-dimensional visualization in order to display said two-dimensional visualization in said second selected projection plane;

displaying said two-dimensional visualization in said second selected projection plane; and generating a fully computed two-dimensional projection of said three-dimensional model in said second selected projection plane after said two-dimensional visualization in said second selected projection plane has been displayed, said fully computed projection of said three-dimensional model being processed by said computer generating full drafting data, wherein computer processing time of said two-dimensional visualization of the object being processed without generating full drafting data is substantially reduced with respect to computer processing time of said fully computed projection of said three-dimensional model being processed generating full drafting data, thereby substantially improving efficiency in displaying said computer-generated two-dimensional projection of a three-dimensional model of an object on a display in a desired plane.

9. The projection plane manipulator tool of claim 7 wherein selecting the interactive device is accomplished by clicking a pointing device controlling a cursor while the cursor is positioned over the interactive device.

10. The projection plane manipulator tool of claim 7 wherein the user interactive device is incorporated into a graphical manipulator software tool.

* * * * *